(12) United States Patent  
Hiratsuka et al.

(10) Patent No.: US 7,070,871 B2  
(45) Date of Patent: Jul. 4, 2006

(54) METALLIC THIN FILM TYPE MAGNETIC RECORDING MEDIUM AND METHOD OF MANUFACTURING THEREOF

(75) Inventors: Ryoichi Hiratsuka, Miyagi (JP); Ichiro Kanagawa, Miyagi (JP); Kasumi Suzuki, Miyagi (JP); Tomoe Ozaki, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/183,227

(22) Filed: Jun. 27, 2002

(65) Prior Publication Data

US 2003/0039864 A1   Feb. 27, 2003

(30) Foreign Application Priority Data

Jun. 29, 2001   (JP) ............................ P2001-199370

(51) Int. Cl.  
   *G11B 5/66*   (2006.01)
(52) U.S. Cl. .................... 428/832; 428/835.2
(58) Field of Classification Search ............... 428/336, 428/332, 457, 694 T, 694 TS, 694 TP  
See application file for complete search history.

(56) References Cited

U.S. PATENT DOCUMENTS 4,828,905 A   5/1989   Wada et al.  
4,994,320 A   2/1991   Jagielinski  
6,174,597 B1 *   1/2001   Yusu et al.  
2001/0000022 A1 *   3/2001   Shiroishi et al. ............ 360/324

FOREIGN PATENT DOCUMENTS

| FR | 2 098125 | | 3/1972 |
| GB | 2167448 | | 5/1986 |
| JP | 60-85414 | * | 5/1985 |
| JP | 62 146434 | | 6/1987 |
| JP | 7 334836 | | 12/1995 |
| JP | 9 212844 | | 8/1997 |
| JP | 10 317149 | | 12/1998 |

* cited by examiner

*Primary Examiner*—Kevin M. Bernatz  
(74) *Attorney, Agent, or Firm*—Sonnenschein Nath & Rosenthal LLP

(57) ABSTRACT

A method of manufacturing a metallic thin film type magnetic recording medium is provided. The method comprises the steps of arranging an initial substance of said recording medium in opposition to a plasma discharge electrode, said initial substance comprising a non-magnetic support base, a metallic layer capable of functioning as a metallic electrode formed on said non-magnetic support base and a metallic magnetic layer formed on said metallic layer, and forming a protection film on a surface of said initial substance of said recording medium by way of generating plasma discharge while feeding raw material gas between said metallic layer/said metallic magnetic layer and said plasma discharge electrode.

5 Claims, 2 Drawing Sheets

100A

100

100A

US 7,070,871 B2

METALLIC THIN FILM TYPE MAGNETIC RECORDING MEDIUM AND METHOD OF MANUFACTURING THEREOF

CROSS REFERENCES TO RELATED APPLICATIONS

The present document is based on Japanese Priority Document JP 2001-199370, filed in the Japanese Patent Office on Jun. 29, 2001, the entire contents of which being incorporated herein by reference.

BACKGROUND OF THE INVENTION

1. Field of the Invention

The present invention relates to a so-called metallic thin film type magnetic recording medium comprising metallic magnetic thin film formed on a non-magnetic support base and a method of manufacturing it. More particularly, the present invention relates to a metallic thin film type magnetic recording medium available for a durable video tape with a longer recording time or a tape for high density magnetic recording, which may be used as a large capacity tape streamer. The present invention also relates to a method of manufacturing such a magnetic recording medium.

2. Description of the Related Art

Conventionally, such a so-called coating type magnetic recording medium is widely known as a magnetic recording tape for recording audio signal and video signal. The coating type magnetic recording medium is manufactured by coating and drying of magnetic paint on non-magnetic supporting base. The magnetic paint may be produced by way of dispersing magnetic powder such as magnetic oxide powder or magnetic alloy powder in a variety of bonding agents such as copolymer of vinyl chloride and vinyl acetate, polyester resin, polyurethane resin, or urethane resin, for example.

Along with growing demand for higher density recording in recent years, so-called magnetic thin film type magnetic recording medium has been introduced. This type of magnetic recording medium comprises a magnetic layer directly formed on a non-magnetic supporting base or via an extremely thin adhesive layer. The magnetic layer is formed using metallic magnetic material such as Co—Ni alloy, Co—Cr alloy, or Co—O by applying a variety of vacuum thin film forming techniques such as a plating method, vacuum vapor deposition method, sputtering method, or ion plating method, or the like.

Because of distinguished coercivity, square ratio, and capability to form a magnetic layer into an extremely thin layer, the above metallic thin film type magnetic recording medium has a superior electromagnetic conversion characteristics in short wave band and can significantly minimizes demagnetization in the recording and loss of thickness during a replay operation as well. Further, unlike the coating type magnetic recording medium, inasmuch as no binder comprising non-magnetic material is present in the magnetic layer, it is possible to enhance density of ferromagnetic metallic particles to be filled therein, thus providing various advantages.

Further, in order to improve electromagnetic conversion characteristics and generate larger output, such a method of obliquely forming the magnetic layer via so-called diagonal vapor deposition method has already been in practical use.

Typically, in the above cited metallic thin film type magnetic recording medium, in order to improve durability and running characteristics, either a protection layer is formed on the magnetic layer or a back layer is formed on the opposite side surface from the surface on which the magnetic layer is formed.

Further, in the metallic thin film type magnetic recording medium, in order to minimize spacing loss in correspondence with the higher density recording, the surface of this magnetic recording medium has been smoothened furthermore.

Nevertheless, after further smoothening the surface of the magnetic layer, an area in contact with a magnetic head expands. The expansion causes friction force to be intensified and shearing force in the magnetic layer to be risen. In order to protect the magnetic layer from such severe frictional sliding condition, a protection film may also be formed over the magnetic layer.

It is known that the protection film can be formed with a carbon film, a quartz ($SiO_2$) film, or a zirconia ($ZrO_2$) film, for example. These films have already been applied to a hard disc. In recent years, among a variety of carbon films, a rigid carbon film (so-called a diamond-like carbon film) formed with diamond structure has widely been utilized as a distinguished protection film. The protection film comprising rigid carbon is formed by applying such a typical sputtering method or a plasma CVD (chemical vapor deposition) method.

In the case of applying the sputtering method, initially, availing of electric field or magnetic field, sputtering gas comprising argon gas is ionized and turned into plasma, and then the plasma is accelerated to hit against a target surface. Target atoms are sputtered out from the target surface to which the plasma particles are collided. The sputtered atoms are deposited on an object to be processed to form a sputter film. However, in the case of forming the rigid carbon film via the sputtering process, it is found that a rate of forming the carbon film is generally slow. Accordingly, this sputtering process is disadvantageous in view of industrial productivity.

On the other hand, in the case of applying the above plasma CVD method, initially, raw material gas for forming the film is subject to chemical reaction thereby generating decomposition or synthesis of the raw material gas by effect of energy of plasma generated by the electric field. Resultant material generated from the chemical reaction is then deposited on the processed object to form the CVD film. The plasma CVD method forms the CVD film much faster than the above sputtering method, and thus, the plasma CVD method is quite promising as an effective means for forming the rigid carbon protection film.

Referring to a plasma CVD processing apparatus shown in FIG. 2, a method of forming a rigid carbon protection film using the plasma CVD method is described below.

The plasma CVD processing apparatus shown in FIG. 2 comprises a vacuum chamber 11 including a cylindrical rotating support body 12 with ground potential, a reaction tube 13 disposed by way of facing the rotating support body 12, and a discharge electrode 14 fitted inside of the reaction tube 13. An end 15 of the reaction tube 13 penetrates the bottom portion of the vacuum chamber 11 in order to introduce reaction gas for forming a rigid carbon film including vaporized aliphatic hydrocarbons such as ethylene or such gas comprising aromatic hydrocarbon vaporized from liquid material such as toluene for example inside of the reaction tube 13 via an end 15 of the reaction tube 13. It is preferred to utilize the discharge electrode 14 that is capable of easily letting gas components through it and evenly generating electric field. Accordingly, it is preferred to configure the discharge electrode 14 with a mesh form for accommodating structural flexibility. Although copper is cited as a typical material, any metal having a reasonably large electric conductivity may also be utilized, which includes stainless steel, brass, and gold, for example.

In the plasma CVD processing apparatus shown in FIG. 2, an object 16 to be processed and formed with a CVD film is guided between a supply roll 17 and a take-up roll 18 by a pair of guide rolls 19 in order that it can continuously run itself along the surface of the above rotating support body 12. When the object 16, which continuously running through the rolls, arrives at a location of the rotating support body 12 corresponding to a position opposite from the discharge electrode 14, plasma is generated between metallic magnetic layer of the object 16 and the discharge electrode 14 to cause reaction such as decomposition or synthesis of raw material gas to be generated. As a result, decomposed or synthesized material generated via the above reaction is deposited in succession to cause the CVD film consisting of such a rigid carbon protection film. Simultaneously, current is grounded via the object 16 and the rotating support body 12 having the ground potential.

As described above, by operating the above plasma CVD processing apparatus shown in FIG. 2, the raw material gas is decomposed by effect of plasma discharge between metallic component present in the object 16 and the discharge electrode 14, whereby forming a rigid carbon protection film.

SUMMARY OF THE INVENTION

In response to a demand for still higher density recording capability of magnetic recording media, in place of conventional induced type heads, a magneto-resistive effect type magnetic head (MR heads) has recently been introduced as a magnetic head usable for reading out recorded data.

The above MR head has characteristics capable of detecting minimal leakage flux from a magnetic recording medium with high sensitivity. Because of the characteristics, it is possible to eliminate noise component by way of further thinning film of metallic magnetic layer to improve surface recording density.

On the other hand, along with further thinning of the metallic magnetic layer, its specific resistance is increased to make it difficult to execute stabilized discharge during the above plasma CVD processing apparatus.

Unless plasma discharge is stabilized, there are disadvantages such that the rate of forming the above rigid carbon protection film, which is formed through the plasma discharge, is decreased, and eventual quality of the formed film can easily be deteriorated. Accordingly, the lower the film forming rate, the lower will be the number of magnetic recording medium produced per unit time, thus lowering productivity.

If it is merely intended to achieve stabilized discharge of plasma, the problems may be solved by solely thickening a thickness of the metallic magnetic layer. However, this may counteract the contemporary need to thin off the metallic magnetic layer to result in contradiction to the above described recent trends in development of the metallic thin film type magnetic recording medium.

Accordingly, it is desirable to provide a metallic thin film type magnetic recording medium capable of alleviating or solving the above problems, forming a protection film at a preferable processing rate, and properly decreasing overall thickness thereof. Further, it is desirable to provide a novel method of manufacturing the metallic thin film type magnetic recording medium.

According to one embodiment of the present invention, there is provided a metallic thin film type magnetic recording medium comprising a non-magnetic support base, a metallic layer functioning as a metallic electrode formed on the non-magnetic support base, and a protection layer formed on the metallic magnetic layer. Further, according to another embodiment of the present invention, there is provided a method of manufacturing the metallic thin film type magnetic recording medium. The method comprises the steps for disposing an initial substance of a recording medium comprising a non-magnetic support base, a metallic layer functioning as a metallic electrode formed on the non-magnetic support base, and a metallic magnetic layer formed on the metallic layer, by way of facing a plasma discharging electrode, wherein the method forms a protection film on a surface of the initial substance of a recording medium by applying a vacuum thin film forming technique which causes raw material gas to discharge itself while feeding the raw material gas between the metallic layer/the metallic magnetic layer and the plasma discharging electrode.

Embodiments of the present invention is described in detail below. The present invention provides means to thin off the metallic thin film type magnetic recording medium (this will merely be called a recording medium in the following description) and improve its productivity. Further, the present invention provides means to form a protection film (to be formed on a recording medium) at a faster rate.

When the thinning off process of the metallic magnetic layer constituting the main structural element of a recording medium is performed as was done via the above referred conventional art, a speed of forming the protection film during the plasma CVD process, which is performed after the thinning off process, may be lowered.

To prevent this, by way of preferably forming the metallic layer comprising non-magnetic metal between a metallic magnetic layer and a non-magnetic support base, the present invention provides technologies for simultaneously thinning off the recording medium and forming the protection film at a faster rate.

In order to form the above metallic layer, it is preferred to use such metal or alloy having a specific resistance value lower than that of the metallic magnetic layer. The metallic magnetic layer may include aluminum, copper, tungsten, magnesium, molybdenum, silicon, and brass, respectively having a resisitvity equal or less than 420 $\Omega/\text{inch}^2$. Although rather expensive from industrial viewpoint, gold or silver may also be used.

It is desirable that, by way of thinning a film thickness of the metal layer to a value thinner than the reduced amount of film thickness of the metallic magnetic layer, a film thickness of the recording medium is thinned off. Further, the thickness of the metallic layer is determined so as to maintain sum of specific resistance values of the metallic layer and the metallic magnetic layer within a predetermined range, thereby securing proper speed for forming the protection film as an essential function of metallic layer via the plasma CVD method.

A preferred film thickness of the metallic layer is dependent on a variety of conditions. Preferably, the film thickness may be set to equal or less than 100 nm, more preferably equal or less than 50 nm. The sum of specific resistance values of the metallic layer and the metallic magnetic layer is largely dependent on the thickness of the metallic magnetic layer. Although a range of desired specific resistance values may not generally be specified, when the metallic magnetic layer has 50–100 nm of thickness, it is desirable that the preferable specific resistance value remains equal or less than $50\times10^{-6}$ Ωm, and preferably equal or less than $30\times10^{-6}$ Ωm.

When forming the above protection film on the recording medium (initial substance of the recording medium) comprising the metallic layer having the above described characteristics by utilizing the above described plasma CVD processing apparatus, because of the presence of the metallic layer, the sum of specific resistance values of the metallic layer and the metallic magnetic layer sharply decreases. This in turn stabilizes plasma discharge and makes it possible to hold the speed of forming a rigid carbon protection film at a higher rate, and prevents the quality of the formed film from being degraded. After thinning the thickness of the metallic layer to a value less than the reduced amount of the film thickness of the metallic magnetic layer, overall thinning of the recording medium is achieved.

Further, by way of using material of a higher mechanical strength for composing the metallic layer, it is possible to maintain mechanical strength of the recording medium otherwise likely to cause mechanical strength to be lowered due to the thinning at such a degree equivalent to or more than that of a conventional recording medium having the film thickness without having the thinning off process.

Individual elements other than the metallic layer are described below. Any of those known materials usable for a normal magnetic tape may also be used for composing the non-magnetic support base, which, for example, include the following polyester groups: polyethylene terephthalate (PET), polyethylene naphthalate (PEN), polytetramethylenephthalate, poly-1, 4-cyclohexanedimethylene phthalate, polyethylene 2, 6-naphthalene carboxylate, polyethylene-p-oxobenzoate, or the like. In particular, because of availability and ease of fabrications, PET and PEN are suitable for use.

The above polyester group may comprise homo-polyester or copolyester.

Any of those ferromagnetic metals such as Fe, Co, Ni and any of those ferromagnetic alloys cited below may be used for composing the metallic magnetic layer to be formed on the metallic layer. The ferromagnetic alloys may include Fe—Co, Co—O, Fe—Co—Ni, Fe—Cu, Co—Cu, Co—Au, Co—Pt, Mn—Bi, Mn—Al, Fe—Cr, Co—Cr, Ni—Cr, Fe—Co—Cr, Co—Ni—Cr, and Fe—Co—Ni—Cr. Further, the metallic magnetic layer may comprise a single layer or multiple layers.

In order to form the metallic magnetic layer, a variety of vacuum thin film forming techniques may be utilized. For example, in the present invention, a vacuum vapor deposition method that thermally vaporizes metallic magnetic material in vacuum and then deposits the vaporized metallic magnetic material on a metallic layer, an ion plating method that vaporizes metallic magnetic material in the discharge environment, and a so-called PVD technique including such a sputtering process to eject atoms from target surface by utilizing argon ion generated via glow discharge took place in such ambient mainly comprising argon gas.

The protection film like a rigid carbon protection film for example is formed on the above referred metallic magnetic layer. Preferably, the rigid carbon protection film comprises such a carbon film having diamond-like structure, in other words, it corresponds to the so-called diamond-like carbon film. Such carbon film consisting of graphite structure or diamond-like structure is known. By way of measuring Raman spectrum, individually derived peaks can be observed. In the diamond-like carbon film, at least a part of the carbon film incorporates diamond-like structure. When measuring Raman spectrum, individual peaks derived from the diamond structure can be observed. Normally, such peaks derived from the diamond structure appear along with such peaks derived from graphite structure.

In order to form the protection layer, any of those known materials conventionally used for composing a protection layer for protecting a metallic magnetic thin film may also be used. Not only carbon, but any of those cited below may also be used, which, for example, include the following: $CrO_2$, $Al_2O_3$, BN, oxidized Co, MgO, $SiO_2$, $So_3O_4$, SiNx, SiC, $SiNx-SiO_2$, $ZrO_2$, $TiO_2$, TiC, MoS, or the like.

The above protection film may be formed by utilizing a known vacuum film forming technique such as a plasma CVD method. The plasma CVD method decomposes carbon compound in plasma before forming thin film. By utilizing the plasma CVD method, it is possible to stably form the rigid carbon layer with a thickness equal or less than 10 nm, where the rigid carbon is called diamond-like carbon which has distinguished wear resistant property, corrosion resistant property, surface covering property, smooth surface configuration, and a high electric resistance value.

In this case, any of those known materials such as hydrocarbon group, ketone group and alcoholic group may be used for preparing carbon compound. In order to decompose the carbon compound in plasma, a certain bias voltage of high frequency may be utilized. While generating the plasma, in order to promote the decomposition of carbon compound, argon gas or $H_2$ gas may be used.

In order to improve hardness and corrosion resistant property of the diamond-like carbon film, the carbon may remain in such a state that is being reacted with nitrogen or fluoride, and further, the diamond-like carbon film may comprise a single layer or multiple layers. During the generation of plasma, the film may be formed in gaseous environment including, in addition to the carbon compound, various gases such as $N_2$ gas or $CHF_3$ gas or $CH_2F_2$ gas, or a proper mixture of these gases.

If the protection film is formed with an excessive thickness, a loss due to spacing may increase. Conversely, if the protection film is formed too thin, the wear resistant property and the corrosion resistant property may be degraded. To prevent this, it is desirable that the protection film be formed with 4–15 nm of thickness.

Further, whenever deemed necessary, it is preferable to form a back coating layer on a surface opposite from the side in which the metallic magnetic layer of the non-magnetic support base is formed, or form a ground layer between the non-magnetic support base and the metallic magnetic film in addition to the metallic layer, or form a lubricant layer on the protection layer. In this case, such conventionally known agents may also be used for composing non-magnetic pigments, resin bonding agent, or lubricating agent for preparing the back coating layer.

The recording medium according to the embodiments of the present invention is suitable for use as an MR head. Further, the recording medium may also be utilized for an induction type head.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

Referring now to the accompanying drawings, a metallic thin film type magnetic recording medium according to embodiments of the present invention is described below.

Figure 1A:
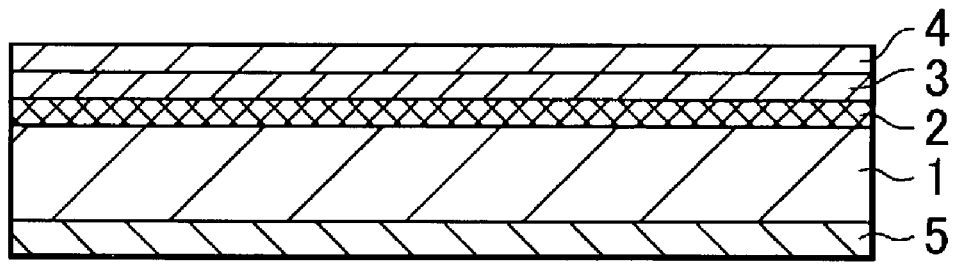
FIG. 1A presents a vertical sectional view for explanatory of a practical aspect for embodying a metallic thin film type magnetic recording medium related to the present invention.
Figure 1B:
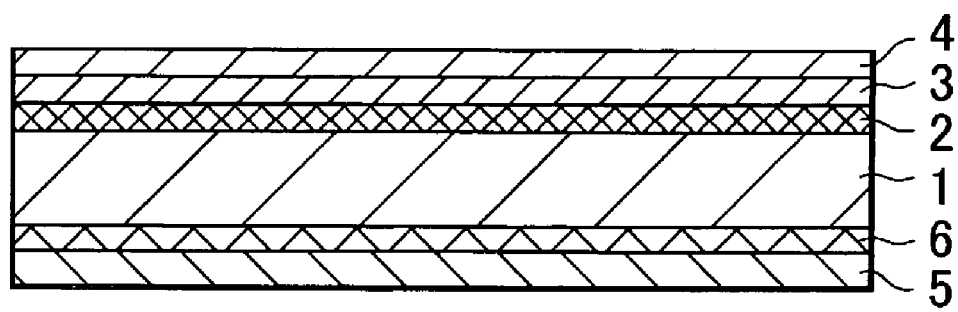
FIG. 1B presents a vertical sectional view for explanatory of another practical aspect of the metallic thin film type magnetic recording medium related to the present invention.

FIG. 1A presents a vertical sectional view of a metallic thin film type magnetic recording medium in accordance with one embodiment of the present invention. FIG. 1B presents a vertical sectional view of a metallic thin film type magnetic recording medium in accordance with another embodiment of the present invention.

In the metallic thin film type magnetic recording medium 100 shown in FIG. 1A, the upper surface of a non-magnetic support base 1 composed of polyester resin such as polyethylene terephthalate having 2–5 μm of thickness is coated with a metallic layer 2 preferably having 20–100 nm of thickness by utilizing a vacuum vapor deposition process. It is desirable that the upper surface of the metallic layer 2 be coated with lubricating agent and corrosion proof agent. Such a conventionally available lubricating agent for application to a magnetic tape may also be utilized. The lubricating agent structurally based on fluorocarbon, alkylamine, or alkylester, is particularly suitable for use.

The metallic layer 2 is covered with a metallic magnetic layer 3 mainly composed of ferromagnetic metallic material. It is preferable that the sum of specific resistance values of the metallic layer 2 and the metallic magnetic layer 3 may remain equal or less than $50 \times 10^{-6}$ Ωm. Further, the metallic magnetic layer 3 is covered with a protection film 4 comprising rigid carbon protection film.

It is desirable that the above referred coating be applied to the bottom surface of the non-magnetic support base 1. Further, by way of coating the back surface of the non-magnetic support base 1 with such back-coating paint composed of polyurethane group substance, a back-coating layer 5 is formed.

In the recording medium 100 shown in FIG. 1A, the sum of specific resistance values of the metallic layer 2 and the metallic magnetic layer 3 is held below a predetermined value due to use of the metallic layer 2 sandwiched between the non-magnetic support base 1 and the metallic magnetic layer 3. Accordingly, unlike such a conventional recording medium merely consisting of thinned thickness of the metallic magnetic layer, the film forming rate is properly maintained above a predetermined value without causing the film forming rate to be lowered excessively in the course of forming the protection film 4 by applying vacuum film forming technique,.

In the metallic thin film type magnetic recording medium 100A shown in FIG. 1B in accordance with another embodiment of the present invention, in addition to the metallic layer 2 shown in FIG. 1A, a reinforcing layer 6 is disposed between the non-magnetic support base 1 and the back layer 5. In the practical aspect shown in FIG. 1B, inasmuch as the reinforcing layer 6 promotes mechanical strength of the whole of the metallic thin film type magnetic recording medium 100A, it is possible to thin off the thickness of the non-magnetic support base 1 to be thinner than the that of a conventional support base without lowering overall mechanical strength thereof. Further, because of the presence of the metallic layer 2, it is possible to form the protection film 4 at such a rate beyond the predetermined value.

EXAMPLES

Next, practical examples and comparative examples of the metallic thin film type magnetic recording medium in accordance with the present invention are described below. However, those practical examples described below do not restrict the scope of the present invention.

Examples 1–5 and Comparative Examples 1–4:

(Fabrication of the Metallic Thin Film Magnetic Recording Medium)

To constitute a non-magnetic support base for supporting the metallic thin film type magnetic recording medium shown in FIG. 1A, initially, such a polyethylene terephthalate film with 6 μm of thickness was prepared.

While infusing oxygen during the vacuum vapor deposition process, by applying the vapor depositing condition specified below, a metallic layer was formed on a prepared non-magnetic support base.

Figure 2:
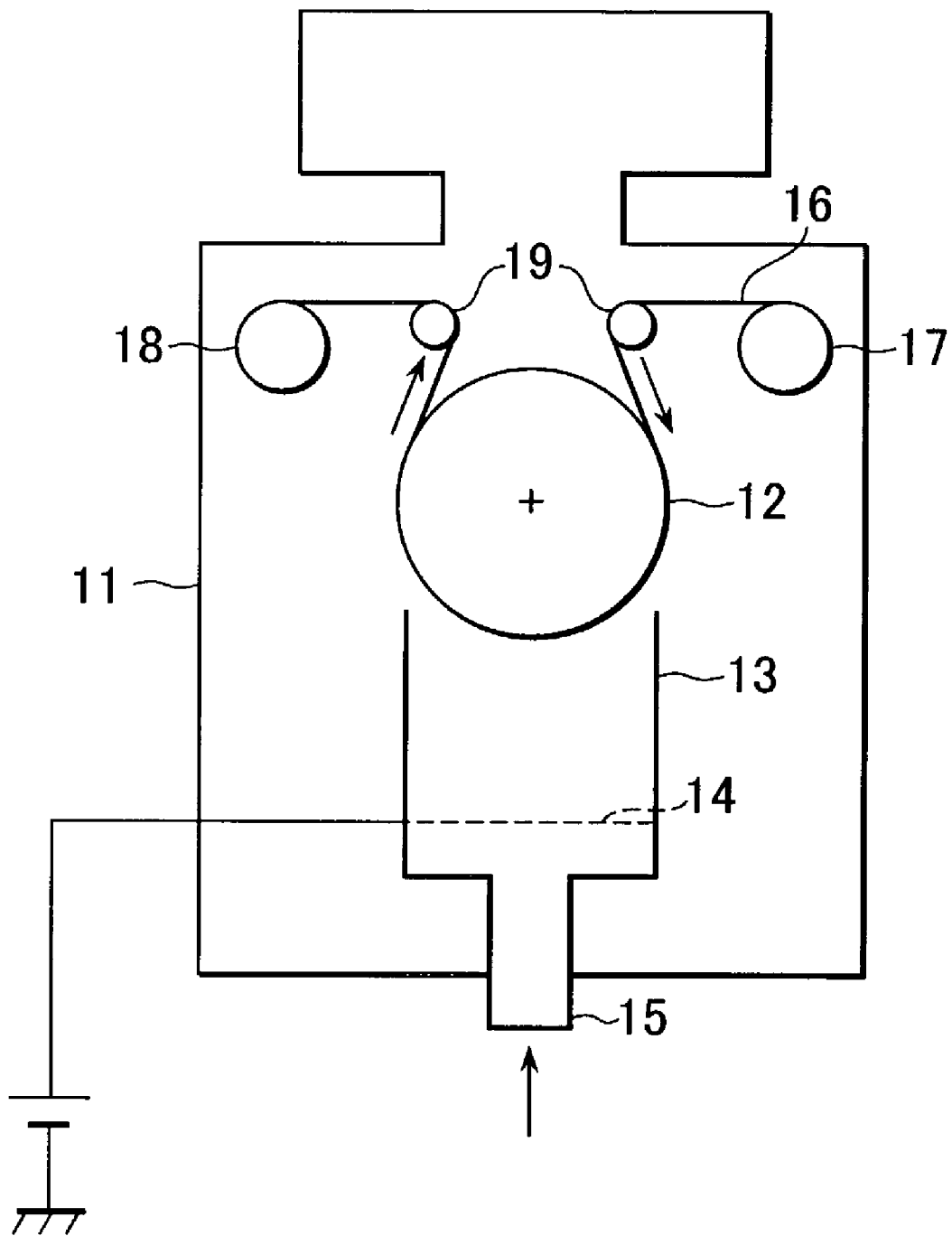
FIG. 2 presents a vertical sectional view for explanatory of an example of a plasma CVD processing apparatus used for forming a rigid carbon protection film by applying plasma CVD method.

Vapor depositing condition:
Metallic material: Al (Aluminum) 100% by weight
Vacuum condition during vapor deposition: $2.0 \times 10^{-2}$ Pa Next, using the vapor depositing apparatus shown in FIG. 2, based on the vapor depositing condition specified below, a metallic magnetic layer was formed by applying an oblique vapor depositing method.

Vapor depositing condition:
Metallic magnetic material: Co (Cobalt) 100% by weight
Incidental angle: 45°–90°
Process gas: Oxygen gas
Vacuum condition during vapor deposition: $2.0 \times 10^{-2}$ Pa Next, based on the condition for forming a protection film specified below, a diamond-like carbon protection film was formed on a magnetic layer by applying plasma CVD method.

Protection film forming condition:
Process gas: Ethylene/argon mixed gas (Argon mixed rate 20% by volume) 150 sccm
Reaction pressure: 30 Pa
Applied power source: DC 1.2 kV Next, lubricating agent was applied onto a surface opposite from the magnetic layer formed surface. This lubricating agent was mainly composed of fluorocarbon, whose trade name was "Demtum", a product of Daikin Industrial Co., Ltd. This lubricating agent was denaturalized by applying dimethyldecylamine corresponding to the tertiary amine and then synthesized so as to form salt structure.

Next, the coated lubricating agent was superficially coated with polyurethane back-coating paint by 0.5 μm of thickness by applying gravure rolling method.

Next, the eventually produced metallic thin film type magnetic recording medium was cut into pieces. Then, the magnetic layer surface was coated with perfluoroether group lubricating agent. Finally, sampling magnetic tapes were fabricated.

In the practical examples 1–5 (provided with a metallic layer and a metallic magnetic layer) and in the comparative examples 1–4 (solely provided with a metallic magnetic layer without having the metallic layer), by way of adjusting film forming time under the above referred film forming conditions, a variety of samples with varied film thickness of the metallic layer and the metallic magnetic layer were produced as shown in Table 1. Next, speed of forming film of the rigid carbon protection film produced under an identical electric resistance condition was measured per sample. In this case, electric resistance was measured against 1 inch square surface area. Film thickness was measured by utilizing sectional TEM method. The measured results per sample are shown in Table 1.

Measured results shown in Table 1 clearly indicate the following: In the case of those samples without the metallic layer corresponding to the comparative examples 1–4, when the film thickness was thinner than 50 nm as shown in the comparative examples 1 and 2, the film forming speed are drastically decreased. It is presumed that, by way of thinning off the film thickness, electric resistance of the metallic magnetic layer had decreased. On the other hand, relative to the increase of the film thickness up to 50 nm as shown in comparative example 2, up to 100 nm as shown in comparative example 3, and up to 150 nm as shown in comparative example 4, the film forming speed was accelerated. Presumably, this is because of the decreased specific resistance of the metallic magnetic layer. Nevertheless, even though the film forming speed was accelerated, it was found that the comparative examples failed to thin off the film thickness and also failed to down-size the whole of recording media.

In the case of the practical examples 1–5 individually having 50 nm of constant film thickness of the metallic magnetic layer and varied thickness of the metallic layer, relative to the increase of the film thickness of the metallic layer up to 10 nm as shown in the practical example 1, up to 20 nm as shown in the practical example 2, up to 30 nm as shown in the practical example 3, up to 50 nm as shown in the practical example 4, and up to 100 nm as shown in the practical example 5, specific resistance values were lowered in turns to 31, 29.5, 27.2, 13, and $9 \times 10^{-6}$ $\Omega$m. On the other hand, in such a manner inversely proportional to the decreased specific resistance values, it was found that the speed of forming the protection film rose up to 320 nm, 370 nm, 390 nm, 410 nm, and 430 nm per minute, respectively.

Comparison between the practical example 5, in which the metallic magnetic layer had 50 nm of film thickness and the metallic layer had 100 nm of film thickness, and the comparative example 3, which had 150 nm of the metallic magnetic layer without incorporating the metallic layer, clarified the following. That is, in the practical example 5, the specific resistance value was as low as 9 and the film was formed at such a rate as fast as 430 nm per minute. In the comparative example 3, the specific resistance value was as high as 22.5 and the film was formed at a rate of 392 nm per minute being considerably lower than that of the practical example 5. By analyzing the above result, it was found that, in the case of such samples having identical film thickness, those samples based on the practical examples with the metallic layer formed the film at such a rate much faster than the comparative examples. Accordingly, it is conceived that, in the case of the samples capable of forming film having an identical film forming speed, such samples with the metallic layer can more easily achieve thinning of film than the samples without the metallic layer.

In view of productivity, it is desirable that the protection film (thickness of the protection film formed in an identical time duration) be formed as fast as possible. On the other hand, considering cost, it is also important to thin off the metallic layer as thin as possible. When considering such a need to restrain decrease of the speed for forming the protection film within 10% against a sufficient speed of forming film, if the metallic layer has a minimum of 20 nm of film thickness, it is possible to restrain decrease of the protection film forming speed within 10%. Further, it is preferable that the metallic layer be provided with 20 nm of film thickness if possible. Value of specific resistance compatible with 20 nm of film thickness is recommended to be $30 \times 10^{-6}$ $\Omega$m.

TABLE 1

| | Thickness of Metallic Magnetic Layer | Thickness of Metallic Layer | Specific Resistance ($\times 10^{-6}$ $\Omega$m) | Protection Film Forming Speed |
|---|---|---|---|---|
| Example 1 | 50 nm | 10 nm | 31 | 320 nm/min |
| Example 2 | 50 nm | 20 nm | 29.5 | 370 nm/min |
| Example 3 | 50 nm | 30 nm | 27.2 | 390 nm/min |
| Example 4 | 50 nm | 50 nm | 13 | 410 nm/min |
| Example 5 | 50 nm | 100 nm | 9 | 430 nm/min |
| Comparative Example 1 | 30 nm | N/A | 54 | 140 nm/min |
| Comparative Example 2 | 50 nm | N/A | 51 | 210 nm/min |
| Comparative Example 3 | 150 nm | N/A | 22.5 | 392 nm/min |
| Comparative Example 4 | 200 nm | N/A | 20 | 420 nm/min |

The present invention provides such a metallic thin film type magnetic recording medium which is formed with a metallic layer between a non-magnetic support base and a metallic magnetic layer. By virtue of the presence of this metallic layer, such problem causing speed of forming the protection film to be lowered due to the thinning of the metallic magnetic layer may be alleviated or solved, whereby making it possible to provide such down-sized recording media at a higher production rate.

In other words, if a film thickness of the initial substance of a recording medium before formation of the protection film is thinner than a film thickness of a conventional corresponding initial substance of a recording medium, and if the sum of specific resistance values of the metallic layer and the metallic magnetic layer becomes equivalent to the specific resistance value of the metallic magnetic layer of a conventional recording medium, even though the protection film may be formed at the similar speed, it is possible to acquire such a down-sized or thinned-off recording medium. Conversely, in such a case in which film thickness is identical to each other, the specific resistance value decreases and the speed of forming the protection film increases, whereby making it possible to manufacture recording media at a higher production rate.

Although the present invention has been described in its preferred form with a certain degree of particularity, obviously many changes, combinations and variations are possible therein. It is therefore to be understood that the present invention may be practiced otherwise than as specifically described herein without departing from the scope of the present invention.

What is claimed is:

1. An evaporated metal tape type magnetic recording medium comprising:
   a non-magnetic support base,
   a metallic layer capable of functioning as a metallic electrode on a first surface of said non-magnetic support base,
   an evaporated metallic magnetic layer having a thickness of 50 nm or less on said metallic layer,
   a protection film deposited on said evaporated metallic magnetic layer, and
   a back layer on a second surface of said non-magnetic support base facing away from said first surface, wherein, said metallic layer and said evaporated metallic magnetic layer have a combined specific resistance equal to or less than $50 \times 10^{-6}$ Ωm before deposition of the protection film so that a deposition rate of said protective layer is maintained at or above "320 nm/mm when using plasma chemical vapor deposition."

2. The evaporated metal tape type magnetic recording medium according to claim 1, wherein said metallic layer is formed with non-magnetic metal or alloy.

3. The evaporated metal tape type magnetic recording medium according to claim 2, wherein said non-magnetic metal or alloy comprises one or a plurality of metals or alloys selected from a group comprising aluminum, copper, tungsten, magnesium, molybdenum, silicon, gold, silver, and brass.

4. The evaporated metal tape type magnetic recording medium according to claim 1, wherein the thickness of said metallic layer is equal or more than 20 nm.

5. The evaporated metal tape type magnetic recording medium according to claim 1, wherein the sum of specific resistances of said evaporated metallic magnetic layer and said metallic layer is equal or less than $30 \times 10^{-6}$ Ωm.

* * * * *